INVENTOR
CHARLES F. WHITE

BY Richard C. Reed

ATTORNEY

Dec. 5, 1967 — C. F. WHITE — 3,356,970

SEVEN ELEMENT ONE-REACTANCE KIND NETWORKS WITH TWO ZEROS, TWO POLES

Filed Feb. 28, 1964 — 3 Sheets-Sheet 2

INVENTOR

CHARLES F. WHITE

BY Richard C. Reed

ATTORNEY

Dec. 5, 1967 C. F. WHITE 3,356,970

SEVEN ELEMENT ONE-REACTANCE KIND NETWORKS WITH TWO ZEROS, TWO POLES

Filed Feb. 28, 1964

3 Sheets-Sheet 3

INVENTOR

CHARLES F. WHITE

BY Richard C. Reed

ATTORNEY

United States Patent Office 3,356,970

Patented Dec. 5, 1967

3,356,970

SEVEN ELEMENT ONE-REACTANCE KIND NETWORKS WITH TWO ZEROS, TWO POLES

Charles F. White, Oxon Hill, Md.
(6810 Bock Road SE., Washington, D.C. 20022)

Filed Feb. 28, 1964, Ser. No. 348,911
13 Claims. (Cl. 333—76)

The invention described herein may be manufactured and used by or for the Government of the United States of America for governmental purposes without the payment of any royalties thereon or therefor.

The present invention relates to insertion-loss networks and more particularly to networks exhibiting a transmission loss with a predetermined variation as a function of frequency.

A frequent requirement in servosystem equalization, in data processing system designs and in certain system phase-correction applications is the need for a notch network, that is a network with a voltage transfer function having two conjugate-complex zeros of transmission with the result that a specified maximum transmission loss at a predetermind frequency is provided with progressively less loss at frequencies below and above the predetermined maximum loss frequency. When a weapons system, for example, is developed to the stage of interconnecting the various subsystems a network is often needed to stabilize the system and to modify the overall system loop gain as a function of frequency to obtain a prescribed system performance. Very often the requirements of such a network will be specified by an equation representing the transfer function. Given a transfer function with two conjugate-complex zeros of transmission for example, the classical network synthesis procedures, namely the parallel-ladder method of Guillemin, "Synthesis of RC-Networks," Journal of Mathematics and Physics, vol. 28, No. 1, 1949, pp. 22–42; or Dasher, "Synthesis of RC-Transfer Functions as Unbalanced Two Terminal-Pair Networks," Transactions of the IRE Professional Group on Circuit Theory, PGCT-1, December 1952, pp. 20–34, produce a 10-element RC network in the one case, and typically a 9-element network in the other. Both of these so called classical direct network synthesis procedures lead to networks that exhibit a frequency-independent or flat component of loss. Activity in this field has included efforts to define the minimum number of elements required for network realization of transfer functions of this general type, such as Hakimi and Cruz, "On Minimal Realization of RC Two-Ports," Proceedings of the National Electronics Conference, vol. 16, 1960, pp. 258–267, which paper presents a five-element network for a restricted range of transfer functions of the notch network type.

Accordingly, it is an object of the present invention to provide a notch type network having an economy in numbers of elements consistent with a wide range of possible variations in the prescribed transfer function.

It is another object of this invention to provide a notch network having no flat loss.

It is another object of the present invention to provide one-reactance-kind insertion-loss networks having seven elements proportioned to provide a transmission loss with a predetermined variation as a function of frequency.

It is a further object of the present invention to provide seven-element, one-reactance-kind insertion-loss networks having a transfer function, $$\frac{E_o}{E_i}=\frac{s^2+as+b}{s^2+cs+d},\ \text{where } d/h<\frac{d-b}{h-a}<c-h$$

where $s=\sigma+jw$, the Laplace transform variable, $E_i$ is the input voltage, $E_o$ is the output voltage, $a$, $b$, $c$, and $d$ are positive, non-zero constants, and $h$ is a positive, non-zero parameter.

Presented are eight seven-element RC and RL transmission networks. These circuits provide the various network solutions of seven elements to the notch type transmission characteristic expressed by $$E_o/E_i=\frac{s^2+as+b}{s^2+cs+d}$$

within specified parameter space. The magnitudes of the elements of these circuits are exactly defined in terms of the constants of this transfer function and a separation parameter which defines the boundaries of these network solutions.

The nature of this invention as well as other objects, and advantages, thereof, will be readily apparent from consideration of the accompanying drawings, in which.

Figure 1:
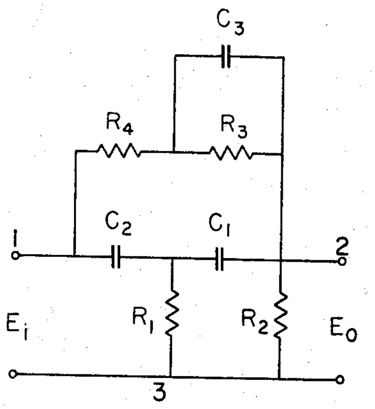
FIGURE 1 shows a seven-element RC notch network.

Referring to the drawings, wherein like reference characters refer to like parts throughout, there is illustrated in FIGURE 1 a seven-element RC network having an input and output terminal, 1 and 2 respectively and a common terminal 3. This four resistor, three capacitor network comprises two current paths directly connecting the output with the input, the first being serially connected capacitors $C_1$ and $C_2$, and the second consisting of serially connected resistors $R_3$ and $R_4$. Resistors $R_1$ and $R_2$ form by-pass current paths to the common terminal 3, $R_1$ being connected to the point of series connection to the capacitor $C_1$ and $C_2$, while $R_2$ is connected to output terminal 2. Capacitor $C_3$, shown shunting resistor $R_3$ and thereby being connected at one end to the output terminal, could just as well have been connected to the input terminal if resistances $R_3$ and $R_4$ had likewise been shifted without causing change to the transfer function. The input voltage $E_i$ is applied across terminals 1 and 3, while the output voltage $E_o$ is realized across terminals 2 and 3.

Figure 2:
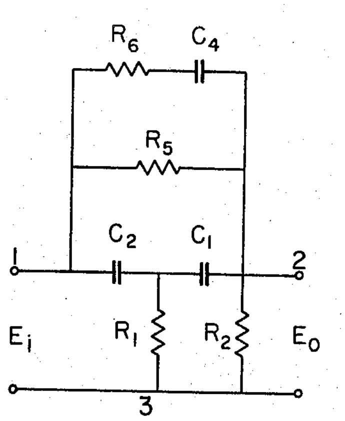
FIGURES 2, 3 and 4 show alternative seven-element RC notch networks.

FIGURE 2 is a representation of a seven-element RC network exhibiting the same transfer function, as that of FIGURE 1, provided the element magnitudes are correctly proportioned as shown in Table 1 below. This circuit has an input terminal 1, an output terminal 2 and a common terminal 3, the input voltage $E_i$ being developed between the input terminal and the common terminal and the output voltage $E_o$ accordingly being developed between the output and common terminal. Three current paths connected in parallel connect the input terminal with the output terminal. The first of these paths constitutes serially connected capacitors $C_1$ and $C_2$. The second path consists of resistor $R_5$, and the third path consists of resistor $R_6$ and capacitor $C_4$. The sixth and seventh elements of this network are resistors $R_1$ and $R_2$, $R_1$ connecting the point of series connection between capacitors $C_1$ and $C_2$ to the common terminal, and resistor $R_2$ connecting the output terminal to the common terminal.

Figure 3:
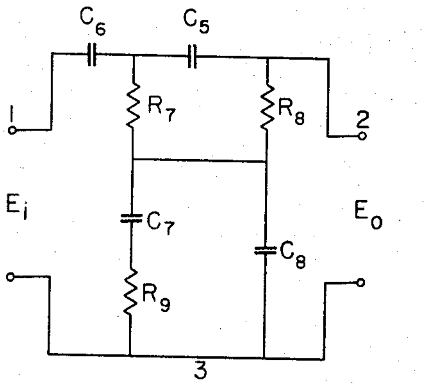

FIGURE 3 shows another seven-element RC notch network. This circuit of 4 capacitors and 3 resistors includes capacitors $C_6$ and $C_5$ serially connecting the input terminal 1 to the output terminal 2. A by-pass to the common terminal 3 from the point of series connection between these two capacitors comprises serially connected resistors $R_7$ and $R_9$ and capacitor $C_7$, the capacitor being disposed between the resistors. The sixth and seventh elements of this circuit are resistor $R_8$ and capacitor $C_8$, connecting output terminal 2 to the common 3. The point of series connection between resistor $R_7$ and capacitor $C_7$ of the by-pass and the point between resistor $R_8$ and $C_8$ are connected together, the connection providing a series loop consisting of capacitors $C_7$, $C_8$ and resistor $R_9$.

Figure 4:
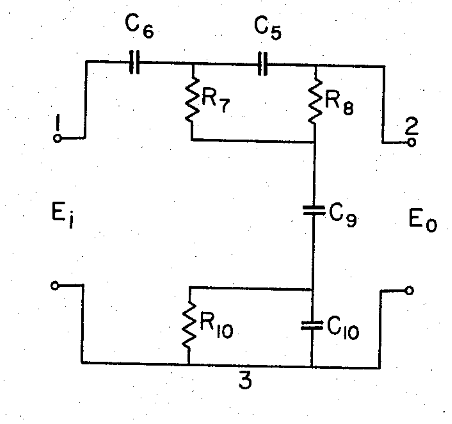

The seven-element RC circuit illustrated in FIGURE 4 comprises serially connected capacitors $C_6$ and $C_5$ connecting the input terminal 1 to the output terminal 2. Series capacitors $C_9$, $C_{10}$ and resistor $R_8$ form a current path between output terminal 2 and the common 3. Resistor $R_7$ joins the point of series connection between capacitors $C_6$ and $C_5$ with the point of series connection between resistor $R_8$ and capacitor $C_9$, while resistor $R_{10}$ shunts capacitor $C_{10}$. Without deviating from the general transfer function to be obtained by this circuit, it should be noted that if capacitors $C_{10}$ and $C_9$ were interchanged the resistor $R_{10}$ could remain shunting capacitor $C_{10}$ without changing the values of these components.

Figure 5:
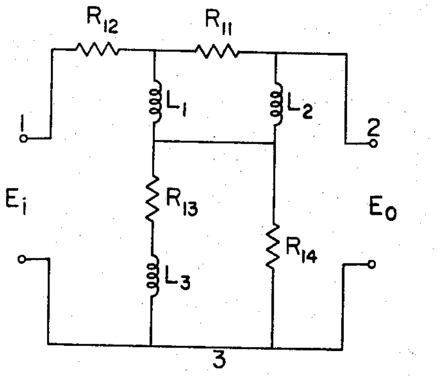
FIGURES 5, 6, 7 and 8 show seven-element RL alternative notch networks.
Figure 6:
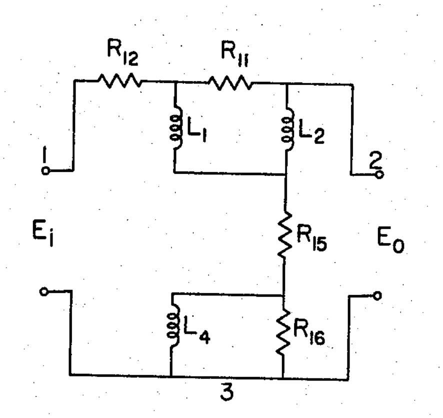
Figure 7:
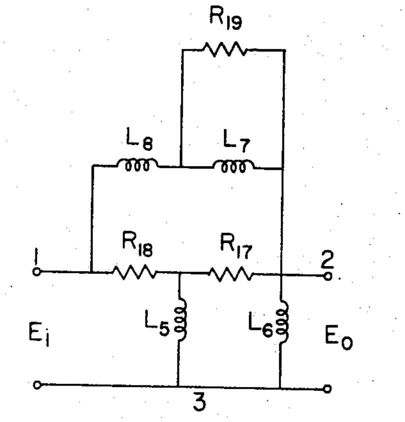
Figure 8:
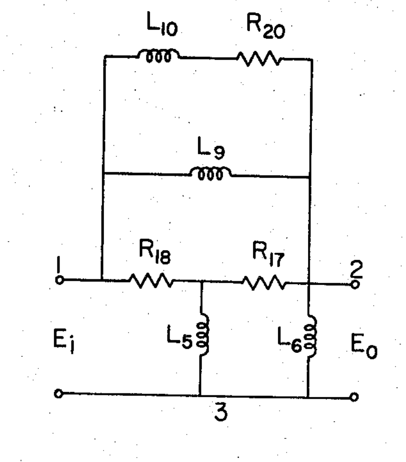

FIGURES 5–8 show the RL counterparts of the circuits of FIGURES 1–4, with the inductors of these figures appearing in the same positions as resistors in the earlier described circuits and resistors appearing in the same position as did the capacitors of the first circuits. FIGURE 5, for example, is a seven-element RL network capable of producing the general notch characteristic transfer function and is the counterpart of the RC circuit shown in FIGURE 3. Here, series resistors $R_{12}$ and $R_{11}$ connect the input terminal 1 to the output terminal 2, while a series string of inductors $L_1$, $L_3$, and resistor $R_{13}$ form a by-pass to common terminal 3 at the point of series connection of the resistors $R_{12}$ and $R_{11}$. Series connected inductor $L_2$ and resistor $R_{14}$ shunt the output terminal 2 to the common terminal 3. This shunt impedence at the point of series connection of its elements is connected to the by-pass circuit at the point of connection between inductor $L_1$ and resistor $R_{13}$. Here, as in FIGURE 3, this connection forms a series loop, the loop consisting of resistors $R_{13}$, $R_{14}$, and inductor $L_3$.

The eight circuits herein described form the various realizations of the general transfer function $$\frac{E_o}{E_i}=\frac{s^2+as+b}{s^2+cs+d} \tag{1}$$

The availability of these seven-element networks as physical realizations of this transfer function depends upon the existence of a separation parameter $h$. In general this separation parameter must satisfy the following inequalities:

$$d/h<\frac{d-b}{h-a}<c-h$$

where $h>0$. Or, for complex zeros of transmission, $h$ can be determined from the following inequalities:

$$\frac{a+c}{2}-\sqrt{\left(\frac{c-a}{2}\right)^2-(d-b)}<h<\begin{matrix}ad/b\\ \frac{a+c}{2}+\sqrt{\left(\frac{c-a}{2}\right)^2-(d-d)}\end{matrix}$$

where the numerically smaller of the two right-hand terms is to be used. With the definition of this parameter in terms of the constants $a$, $b$, $c$ and $d$ of the general transfer function, the values of the elements in each of the eight circuits, set forth in Table I below, are readily determinable.

TABLE I.—VALUES OF THE CIRCUIT COMPONENTS

| Element | Magnitude (ohms, farads, henries) |
|---|---|
| $R_1$, $C_5$, $L_5$ | $\frac{(h-a)(c-h)-(d-b)}{(n-a)(c-h)^2}$ |
| $R_2$, $C_6$, $L_6$ | $\frac{1}{h-a}$ |
| $R_3$, $C_7$, $L_7$ | $\frac{ad-hb}{ab(h-a)}$ |
| $R_4$, $C_8$, $L_8$ | $\frac{1}{a}$ |
| $R_5$, $C_9$, $L_9$ | $\frac{ad-hb}{ab(h-a)}+\frac{1}{a}$ |
| $R_6$, $C_{10}$, $L_{10}$ | $\frac{d-b}{ad-hb}$ |
| $R_{10}$, $C_4$, $1/R_{20}$ | $\frac{(h-a)(ad-hb)}{(d-b)^2}$ |
| $C_1$, $R_7$, $1/R_{17}$ | $\frac{(c-h)(h-a)}{d-b}$ |
| $C_2$, $R_8$, $1/R_{18}$ | $\frac{(h-a)(c-h)}{(h-a)(c-h)-(d-b)}$ |
| $C_3$, $R_9$, $1/R_{19}$ | $\frac{a^2(h-a)}{ad-hb}$ |

NOTE.—Within any one circuit the scaling factor of $10^6$ can be introduced, such that resistance is in the order of megohms and capacitance in the order of micro-farads.

The values of the elements of the networks are defined in terms of the constants $a$, $b$, $c$, $d$ and the parameter $h$. It yet remains, therefore, to complete the synthesis from a transfer response curve as shown in FIGURE 9 and the equation defining it to the circuits here presented, to define the constants $a$, $b$, $c$ and $d$ in terms of the transfer response curve.

Figure 9:
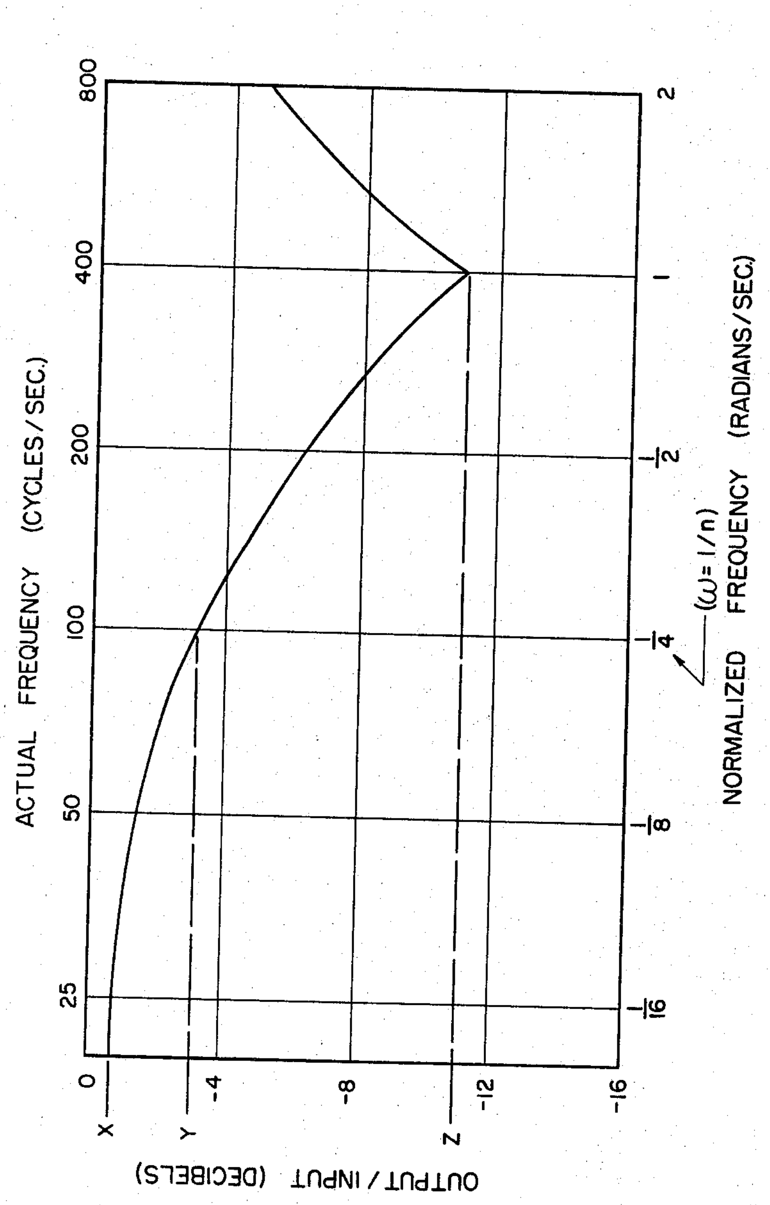
FIGURE 9 is a graphical representation of a notch transmission characteristic.

Observing FIGURE 9, there is shown a typical notch transmission characteristic. To synthesize from this curve the transmission levels $x$, $y$ and $z$ are specified (as arithmetic numbers less than unity) for the desired network performance to be realized at zero frequency or DC, at an intermediate frequency and at the notch center frequency, respectively. The values of $a$, $b$, $c$ and $d$ in terms of these requirements are readily calculated using the following equations:

$$d^2=\frac{1-z^2}{x^2-z^2} \tag{2}$$

$$c^2=\frac{[(n^2-1)x^2-n^2y^2+z^2]d^2+2(y^2-z^2)d-\frac{[n^2(1-z^2)+y^2-1]}{n^2}}{y^2-z^2} \tag{3}$$

$$a^2=[c^2+(1-d)^2]z^2-(1-xd)^2 \quad (4)$$

$$b=xd \quad (5)$$

It thus becomes a simple matter of substitution to obtain values for the constants $a$, $b$, $c$ and $d$ in the general Equation 1 once the values of transmissions $x$, $y$ and $z$ are specified. It should be noted that for purposes of calculation, the frequencies at which the transmission performance is specified, i.e., $x$, $y$ and $z$, is normalized. Thus, 1 being the frequency at the notch, $1/n$ designates the intermediate frequencies such as appears in Equation 3. With $a$, $b$, $c$, $d$ calculated and having obtained a value for the separation perameter $h$, which is provided by solving the inequalities set forth above, the values of the seven elements of each of the networks is readily obtainable from the formulas in Table I. The calculations necessary to obtain these formulas, the inequalities for obtaining $h$ and the equations for realizing values of $a$, $b$, $c$ and $d$ are set forth in greater detail in this inventor's U.S. Naval Research Laboratory Report, No. 5972, "Synthesis of Unity-Gain Complex-Zero RC Networks," August 1963.

Since various changes and modifications may be made in the practice of the invention herein described without departing from the spirit or scope thereof, it is intended that the foregoing descriptions shall be taken primarily by way of illustration and not in limitation except as may be required by the appended claims.

What is claimed is:

1. A seven-element one-reactance-kind insertion-loss network having element magnitudes proportioned to provide a transfer function, $$\frac{E_o}{E_i}=\frac{s^2+as+b}{s^2+cs+d}$$

where $$d/h<\frac{d-b}{h-a}<c-h$$

and where $s=\sigma+jw$, the Laplace transform variable, $E_i$ is the input voltage, $E_o$ is the output voltage, $a$, $b$, $c$ and $d$ are positive non-zero constants, and $h$ is a positive, non-zero parameter.

2. A one-reactance-kind seven-element network having an input terminal, an output terminal and a common terminal, said network comprising:

first impedance means connecting said input terminal to said output terminal;

second impedance means connecting said input terminal to said output terminal;

said first and second impedance means respectively consisting of two elements serially connected;

third impedance means connecting the point of series connection of said first impedance means to said common terminal;

fourth impedance means connected across said output and said common terminals;

fifth impedance means connected across one of said elements of said second impedance means;

where all of said impedance means have values proportioned to produce without a flat loss component a transmission loss with a predetermined variation as a function of frequency.

3. A one-reactance-kind seven-element network as recited in claim 2, wherein the elements of said first impedance means are capacitors and the elements of said second impedance means are resistors.

4. A one-reactance-kind seven-element network as recited in claim 2, wherein the elements of said first impedance means are resistors and the elements of said second impedance means are inductors.

5. A one-reactance-kind seven-element network having an input terminal, an output terminal and common terminal, said network comprising:

first impedance means connecting said input terminal to said output terminal;

second impedance means connecting said input terminal to said output terminal;

third impedance means connecting said input terminal to said output terminal;

said first and third impedance means respectively consisting of two elements serially connected;

fourth impedance means connecting the point of series connection of said first impedance means to said common terminal;

fifth impedance means connected across said output and said common terminals;

where all of said impedance means have values proportioned to produce without a flat loss component a transmission loss with a predetermined variation as a function of frequency.

6. A one-reactance-kind seven-element network as recited in claim 5, wherein the elements of said first impedance means are capacitors, the element comprising said second impedance means is a resistor, and the elements of said third impedance means are a resistor and a capacitor.

7. A one-reactance-kind seven-element network as recited in claim 5, wherein the elements of said first impedance means are resistors, the element comprising said second impedance means is an inductor, and the elements of said third impedance means are a resistor and an inductor.

8. A one-reactance-kind seven-element network having an input terminal, an output terminal and a common terminal, said network comprising;

first impedance means connecting said input terminal to said output terminal;

said first impedance means consisting of two elements serially connected;

second impedance means connecting the point of series connection of said first impedance means to said common terminal;

third impedance means connected across said output and said common terminals;

said second impedance means consisting of three elements serially connected, the first element being connected to said first impedance means and the third element being connected to said common terminal;

said third impedance means consisting of two elements serially connected;

means directly connecting the first element of said second impedance means to said third impedance means at the point of series connection between the elements thereof, whereby a series loop is formed consisting of the second and third elements of said second impedance means and the element of said third impedance connected to said common terminal;

where all of said impedance means have values proportioned to produce without a flat loss component a transmission loss with a predetermined variation as a function of frequency.

9. A one-reactance-kind seven-element network as recited in claim 8, wherein the elements of said first impedance means are capacitors, and the elements of said series loop comprise two capacitors and one resistor.

10. A one-reactance-kind seven-element network as recited in claim 8, wherein the elements of said first impedance means are resistors, and the elements of said series loop comprise two resistors and one inductor.

11. A one-reactance-kind seven-element network having an input terminal, an output terminal and a common terminal, said network comprising:

first impedance means connecting said input terminal to said output terminal;

second impedance means connecting said output terminal to said common terminal;
said first impedance means consisting of two elements serially connected;
said second impedance means consisting of three elements serially connected, the first element being connected to said output terminal and the third element being connected to said common terminal;
third impedance means connecting the first element of said second impedance means to said first impedance means at the point of series connection between the elements thereof;
fourth impedance means connected across one of the other elements of said second impedance means;
where all of said impedance means have values proportioned to produce without a flat loss component a transmission loss with a predetermined variation as a function of frequency.

12. A one-reactance-kind seven-element network as recited in claim 11, wherein the elements of said first impedance means are capacitors, and the elements of said second impedance means comprise a resistor and two capacitors.

13. A one-reactance-kind seven-element network as recited in claim 11, wherein the elements of said first impedance means are resistors, and the elements of said second impedance means comprise two resistors and one inductor.

No references cited.

HERMAN KARL SAALBACH, *Primary Examiner.*
M. L. NUSSBAUM, *Assistant Examiner.*